(12) United States Patent
Yamasaki (10) Patent No.: US 7,822,388 B2
(45) Date of Patent: Oct. 26, 2010

(54) TRANSCEIVER, MODULATION INTEGRATED CIRCUIT, AND RFID READER/WRITER

(75) Inventor: Kazushi Yamasaki, Kyoto-fu (JP)

(73) Assignee: Omron Corporation, Kyoto-Fu (JP)

( * ) Notice: Subject to any disclaimer, the term of this patent is extended or adjusted under 35 U.S.C. 154(b) by 809 days.

(21) Appl. No.: 11/581,484

(22) Filed: Oct. 17, 2006

(65) Prior Publication Data

US 2007/0096878 A1 May 3, 2007

(30) Foreign Application Priority Data

Oct. 31, 2005 (JP) ............................. 2005-316987

(51) Int. Cl.
*H04B 1/38* (2006.01)
*H04B 1/44* (2006.01)

(52) U.S. Cl. ............................. 455/73; 455/78; 375/239

(58) Field of Classification Search ................... 375/239
See application file for complete search history.

(56) References Cited

U.S. PATENT DOCUMENTS

2004/0134985 A1* 7/2004 Deguchi et al. ............. 235/451

2007/0081585 A1* 4/2007 Suematsu et al. .......... 375/239

FOREIGN PATENT DOCUMENTS

JP       2006-72826 A    3/2006
WO   WO 2005069503 A1 *  7/2005

* cited by examiner

*Primary Examiner*—Matthew D Anderson
*Assistant Examiner*—Gennadiy Tsvey
(74) *Attorney, Agent, or Firm*—Dickstein Shapiro LLP (57) ABSTRACT

In a transceiver that selectively transmits a modulated wave and a non-modulated wave to the outside, and receives a response signal from the outside, an S/N ratio during reception is improved. A transceiver, which selectively transmits a modulated wave and a non-modulated wave to the outside, and receives a response signal from the outside, includes an oscillator generating a predetermined carrier wave; a modulator modulating the carrier wave generated by the oscillator with a transmitted baseband signal to generate the modulated wave; a power amplifier amplifying the modulated wave being modulated by the modulator, or the non-modulated wave being not modulated by the modulator; and a circulator for sending output of the power amplifier to an antenna. When the non-modulated wave is transmitted from the antenna, switches are switched to a bypass circuit side such that the oscillator is directly connected to the power amplifier.

3 Claims, 9 Drawing Sheets

-- PRIOR ART --

Fig. 8

-- PRIOR ART --

TRANSCEIVER, MODULATION INTEGRATED CIRCUIT, AND RFID READER/WRITER

BACKGROUND OF THE INVENTION

1. Field of the Invention

The present invention relates to a transceiver, a modulation integrated circuit, and an RFID reader/writer, and particularly relates to a transceiver, a modulation integrated circuit, and an RFID reader/writer that enable improvement in S/N ratio (signal to noise ratio) during reception.

2. Description of Related Art

Figure 7:
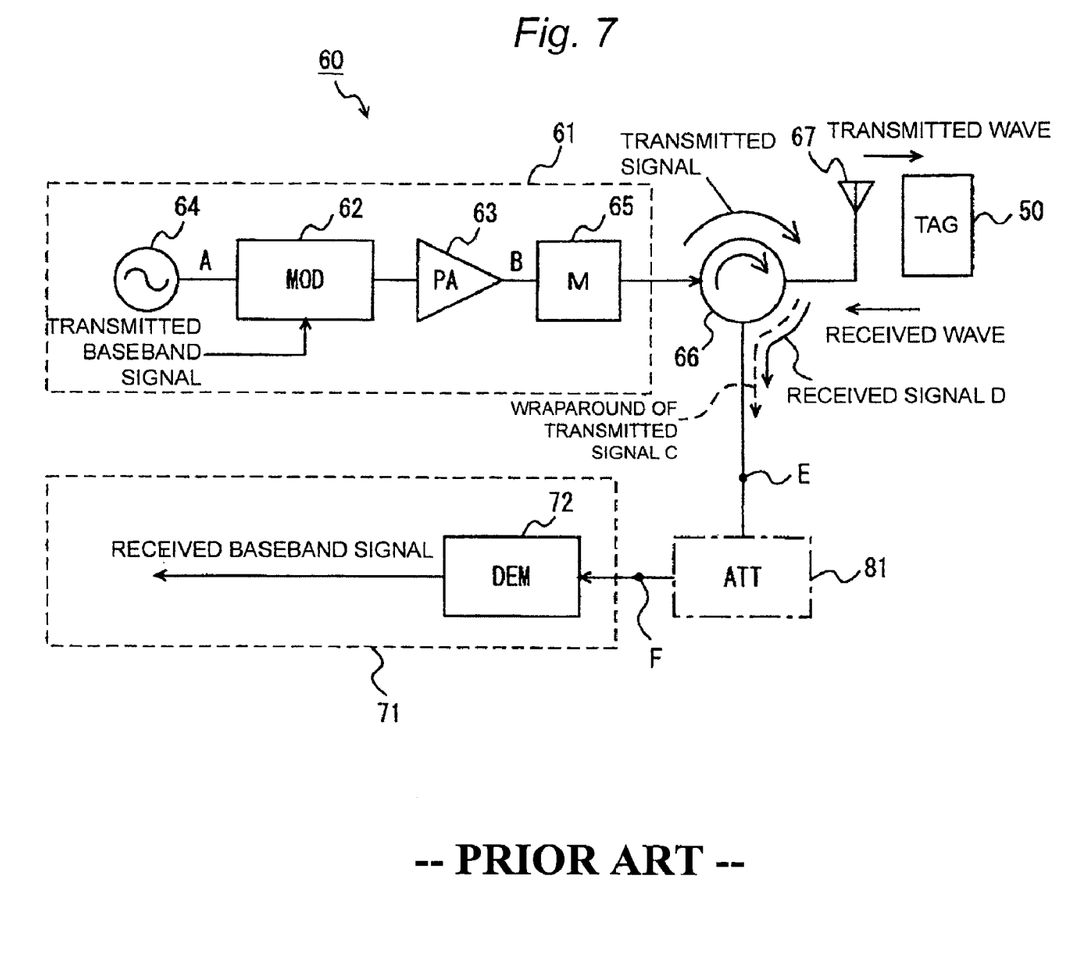
FIG. 7 shows a block diagram showing a relevant part of a reader/writer disclosed in a literature of the related art.

For example, JP-A-2004-206245 (patent literature 1) discloses an RFID (Radio Frequency Identification) reader/writer (noncontact IC card reader/writer) in the related art. FIG. 7 shows a block diagram showing a relevant part of the RFID reader/writer (hereinafter, abbreviated as "reader/writer") 60 disclosed in the patent literature 1.

Referring to FIG. 7, a reader/writer 60 in the related art includes a radio transmission section 61, a radio reception section 71, and a circulator 66 leading a transmitted signal from the radio transmission section 61 to an antenna 67, and leading a received signal from an external tag (radio IC card) 50 received by the antenna 67, and performs transmission and reception with respect to the tag 50 via the antenna 67.

The radio transmission section 61 includes an oscillator 64 generating a carrier wave having a predetermined frequency, a modulator 62 modulating the carrier wave with an inputted transmitted baseband signal, a power amplifier 63, and a matching circuit 65. The radio reception section 71 includes a demodulator 72 in which a received baseband signal is generated.

Communication between the reader/writer 60 and the tag 50 is performed in the following way. In the case of transmitted data transmission, a carrier wave from the oscillator 64 is inputted into the modulator 62 which modulates the carrier wave with data (transmitted baseband signal). Then, such a modulated carrier wave is amplified by the power amplifier 63, and then transmitted from the antenna 67 via the circulator 66 through the matching circuit 65. In the case of only power transmission, the carrier wave from the oscillator 64 is transmitted with being not modulated. Transmission from the reader/writer 60 to the tag 50 is performed by interlinking of magnetic flux produced by the antenna 67 due to electromagnetic coupling with a not-shown antenna coil of the tag 50, exciting an induced voltage. In the tag 50, the induced voltage in the antenna coil is rectified by a rectifier circuit (not shown) in the tag 50 and then used for power of each of circuits in the tag 50. The same induced voltage is led to a demodulation circuit (not shown) to demodulate data from the reader/writer 60.

Next, the reader/writer 60 transmits a non-modulated carrier wave to perform only power supply to the tag 50 during data transmission from the tag 50 to the reader/writer 60. In a tag 50 side, a signal corresponding to data read from an incorporated memory (not shown) is outputted, which is received by the antenna 67, and demodulated by the demodulator 72.

Figure 8:
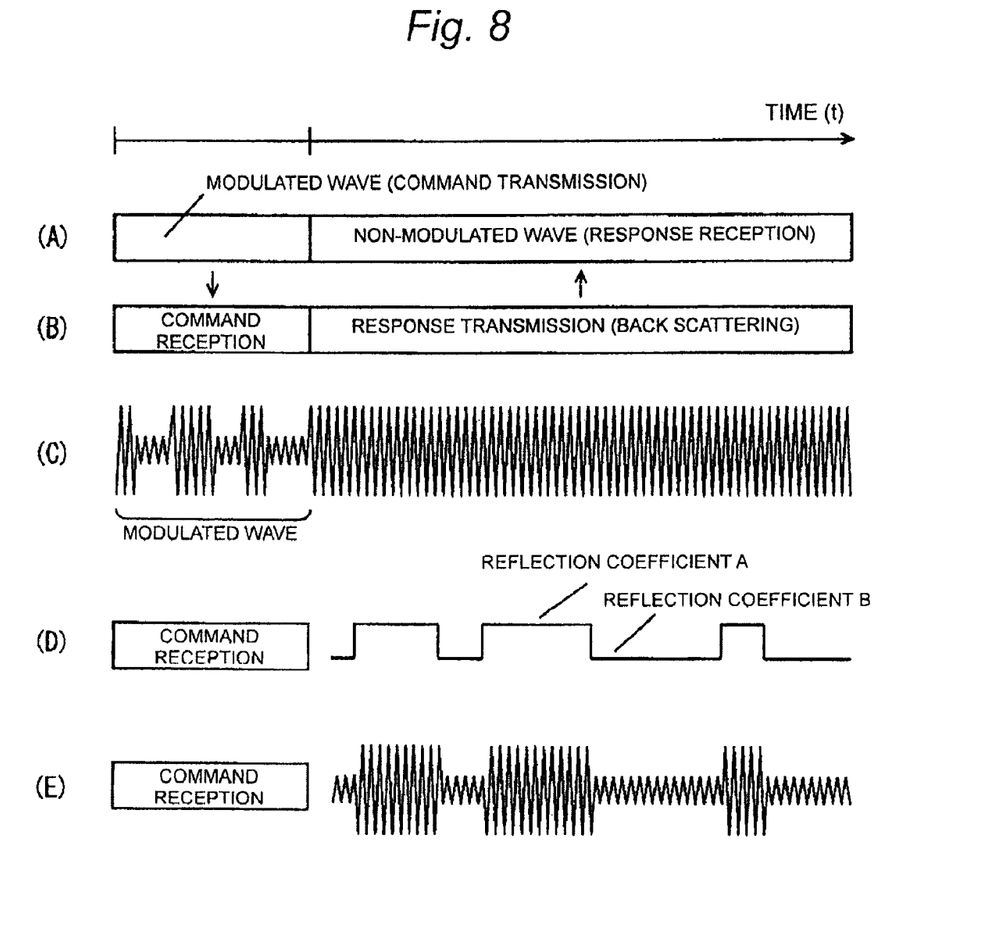
FIG. 8 shows a view showing a transmission signal or the like between a reader/writer and a tag in the same time axis after a command is transmitted from the reader/writer to the tag.

FIG. 8 shows a view showing a transmission signal and the like between the reader/writer 60 and the tag 50 in the same time axis, after a command was sent from the reader/writer 60 to the tag 50. (A) in FIG. 8 shows a view showing command transmission by the reader/writer 60 and response reception timing to the command transmission, and (B) in FIG. 8 shows a view showing command reception by the tag 50 and response transmission timing to the command reception. (C) in FIG. 8 shows a view showing a waveform of a transmitted signal from the reader/writer 60 to the tag 50. (D) in FIG. 8 shows a view showing operation in the tag 50 and an aspect of change between reflection coefficients in response to response data, and (E) in FIG. 8 shows a view showing a response waveform of a transmitted signal from the tag 50 to the reader/writer 60.

Referring to FIG. 8, communication between the reader/writer 60 and the tag 50 is done in the following way. As shown in (A) in FIG. 8, after a command has been transmitted from the reader/writer 60 to the tag 50, a non-modulated wave is transmitted from the reader/writer 60 during response timing in the tag side ((C) in FIG. 8). As shown in (B), (D) and (E) in FIG. 8, response return in the tag side is transmitted by back-scattering the non-modulated wave. Here, back scattering means that a reflection coefficient A is changed into a reflection coefficient B by reflection from an antenna of the tag 50, in the tag 50. That is, in the tag 50 side, a reflection coefficient of the non-modulated wave transmitted from the reader/writer 60 is changed by the back scattering, thereby the response data are modulated ((E) in FIG. 8), and then returned to the reader/writer 60. The reader/writer 60 demodulates the returned signal by the demodulator 72 to obtain the response data from the tag 50.

Patent literature 1: JP-A-2004-206245 (paragraph number 0033, FIG. 2 and the like).

SUMMARY OF THE INVENTION

As above, the reader/writer 60 needs to concurrently transmit a non-modulated wave during reception of a response from the tag 50. However, a difficulty may occur during this (during reception), the difficulty being a difficulty that part of a transmitted signal comes into a side of a reception section in the circulator 66, thereby the demodulator 72 is saturated, causing reduction in reception sensitivity. To make an approach for such a case, it can be considered that an attenuator (as shown by a reference 81 in FIG. 7) is inserted in a previous stage of the radio reception section 71 in order to realize a reader/writer in which the reception section is not saturated in spite of wraparound of the transmitted signal.

However, even if such an approach is performed, the following difficulty may occur. That is, while the radio transmission section 61 sends out a non-modulated wave during timing of reception from the tag 50, the non-modulated wave is hard to be formed as a perfectly non-modulated wave, and actually a carrier wave is modulated by a noise component contained in a transmitted baseband signal or a noise generated in the modulator itself.

Therefore, there is a difficulty that when the non-modulated signal comes into a side of the reception section, the noise component is demodulated, consequently an S/N ratio of a received baseband signal is reduced. A mechanism of such reduction in S/N ratio is described below.

Figure 9:
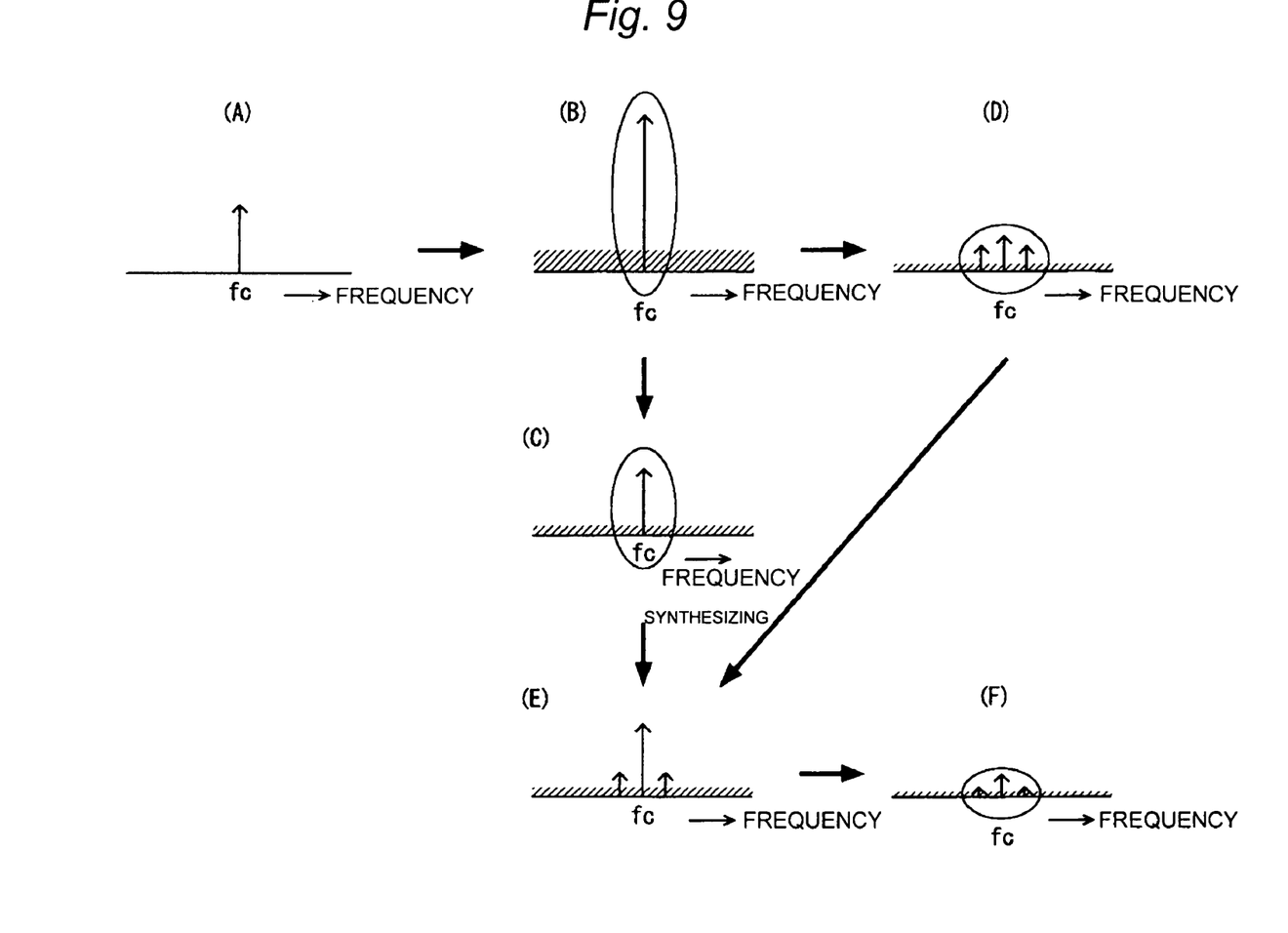
FIG. 9 shows a schematic view for explaining a mechanism of reduction in S/N ratio.

FIG. 9 shows a schematic view for explaining the mechanism of reduction in S/N ratio in the reader/writer 60 shown in FIG. 7. In FIG. 9, a horizontal axis indicates frequency, and a vertical axis indicates intensity of a signal. FIG. 9 includes seven signals from (A) to (F), and positions where respective signals are obtained are shown by alphabet in FIG. 7 respectively.

(A) in FIG. 9 shows a view showing a carrier wave outputted from the oscillator 64, the wave having only a predetermined frequency fc. (B) in FIG. 9 shows a view showing a signal outputted from the radio transmission section 61, the signal being formed of the carrier wave amplified by the power amplifier 63, and containing not only the predetermined frequency fc, but also the noise contained in the transmitted baseband signal or the noise generated in the modulator 61 itself. Here, a noise level is shown by slant lines. As known from the figure, a ratio of a noise level to a level of the carrier wave (C/N ratio: Carrier to Noise ratio) is in a sufficiently high level having not particular influence on operation of the tag 50. (C) in FIG. 9 shows a view showing a wraparound signal of a transmitted signal, in which the carrier wave and the noise level are decreased by a level corresponding to isolation between transmission and reception. (D) in FIG. 9 shows a received signal from the tag 50, in which both of the noise and a signal component are attenuated due to space loss, however, the S/N ratio is in a sufficiently high level. (E) in FIG. 9 shows a synthesized signal of the transmitted wraparound signal as shown in (C) in FIG. 9 and the received signal from the tag 50 as shown in (D) in FIG. 9, the synthesized signal being an input signal into the attenuator 81 in FIG. 7. In the synthesized signal, the S/N ratio of the received signal from the tag 50 is reduced due to the noise contained in the transmission wraparound signal.

(F) in FIG. 9 shows an input signal into the reception section 71, wherein since a signal level is also decreased along with a noise level in the attenuator 81, the S/N ratio is not improved. The signal is inputted into the demodulator 72 and demodulated therein, so that a received baseband signal is formed. Therefore, it is known from the figures that an S/N ratio of the received baseband signal is reduced with increase in wraparound of a transmitted signal.

The present invention solves the problems described above. It is desirable to improve the S/N ratio during reception in the transceiver which selectively transmits a modulated wave and a non-modulated wave to the outside and receives a response signal from the outside, modulation integrated circuit, and RFID reader/writer, which are used for communication with a tag.

A transceiver according to an embodiment of the invention, which selectively transmits a modulated wave and a non-modulated wave to the outside, and receives a response signal from the outside, includes an oscillator generating a predetermined carrier wave; a modulator modulating the carrier wave generated by the oscillator to generate a modulated wave; a transmission unit transmitting the modulated wave modulated by the modulator or a non-modulated wave; and a control unit performing control such that when the transmission unit transmits the non-modulated wave, the oscillator is directly connected to the transmission unit.

Since the oscillator is directly connected to the transmission unit without being routed through the modulator that may be a noise source during transmission of the non-modulated wave, therefore a non-modulated wave containing few noises can be transmitted. Therefore, even if such a transmitted signal becomes a wraparound signal, influence of a noise by the signal is small.

As a result, an S/N ratio during reception of the transceiver, which selectively transmits the modulated wave and the non-modulated wave to the outside, and receives a response signal from the outside, can be improved.

Preferably, the transceiver further includes a bypass circuit for bypassing the modulator by directly connecting the oscillator to the transmission unit, and when the transmission unit transmits the non-modulated wave, the control unit transmits the non-modulated wave to the transmission unit via the bypass circuit.

Further preferably, a switch for routing through one of the bypass circuit and the modulator is provided between the oscillator and the transmission unit, and the control unit performs selection of whether the oscillator is connected to the modulator, or directly connected to the transmission unit, by controlling the switch, so that one of the modulated wave and the non-modulated wave is transmitted from the transmission unit.

In another aspect of the embodiment of the invention, a transceiver, which selectively transmits a modulated wave and a non-modulated wave to the outside, and receives a response signal from the outside, includes an oscillator generating a predetermined carrier wave; a modulator being inputted with a baseband signal produced according to data, and modulating the carrier wave generated by the oscillator with the baseband signal to generate a modulated wave; a transmission unit transmitting the modulated wave modulated by the modulator or a non-modulated wave; and an interruption unit interrupting input of the baseband signal into the modulator when the transmission unit transmits the non-modulated wave.

Since input of the baseband signal that may be a noise source is interrupted during transmission of the non-modulated wave, a non-modulated wave containing no noise of the baseband signal can be transmitted. Therefore, even if such a transmitted signal becomes a wraparound signal, influence of a noise by the signal is small.

As a result, an S/N ratio during reception of the transceiver, which selectively transmits the modulated wave and the non-modulated wave to the outside, and receives a response signal from the outside, can be improved.

Preferably, the modulator includes a switch for making connection to one of the input terminal for inputting the baseband signal and a DC voltage source, and the interruption unit interrupts input of the baseband signal into the modulator by connecting the switch to the DC voltage source.

In still another aspect of the embodiment of the invention, a modulation integrated circuit, which selectively transmits a modulated wave and a non-modulated wave to the outside, includes a carrier wave input terminal for inputting the carrier wave from the outside; a modulator for modulating the carrier wave inputted from the carrier wave input terminal; an output terminal for outputting the modulated wave modulated by the modulator, or the non-modulated wave; and a connection unit connecting the carrier wave inputted from the carrier wave input terminal to the output terminal while passing through the modulator when the modulated wave is outputted, and directly connecting the carrier wave to the output terminal without passing through the modulator when the non-modulated wave is outputted, according to a switching signal from the outside.

In still another aspect of the embodiment of the invention, a modulation integrated circuit, which selectively transmits a modulated wave and a non-modulated wave to the outside, includes an input terminal being inputted with a baseband signal produced according to data from the outside; a modulator being provided in a manner connectable to the input terminal, and generating the modulated wave by modulating the carrier wave inputted from the outside with the baseband signal; an output terminal for outputting the modulated wave modulated by the modulator, or the non-modulated wave; and an interruption unit interrupting connection of the modulator to the input terminal when the non-modulated wave is outputted from the output terminal, according to a switching signal from the outside.

Preferably, an RFID reader/writer has the above integrated circuit.

DESCRIPTION OF THE PREFERRED EMBODIMENT

Figure 1:
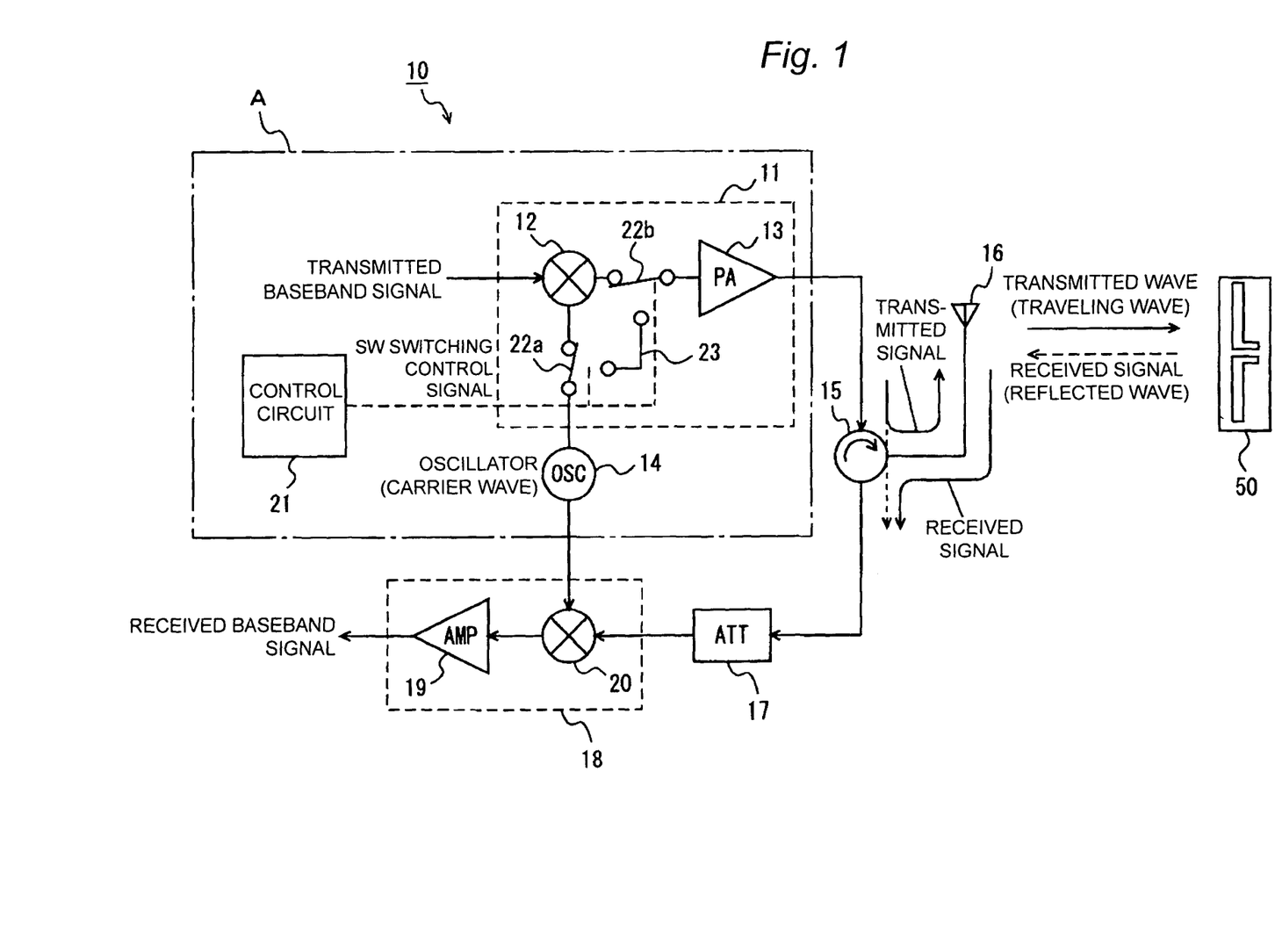
FIG. 1 shows a block diagram showing a relevant part of a reader/writer according to an embodiment of the invention, illustrating a condition during a modulation period.
Figure 2:
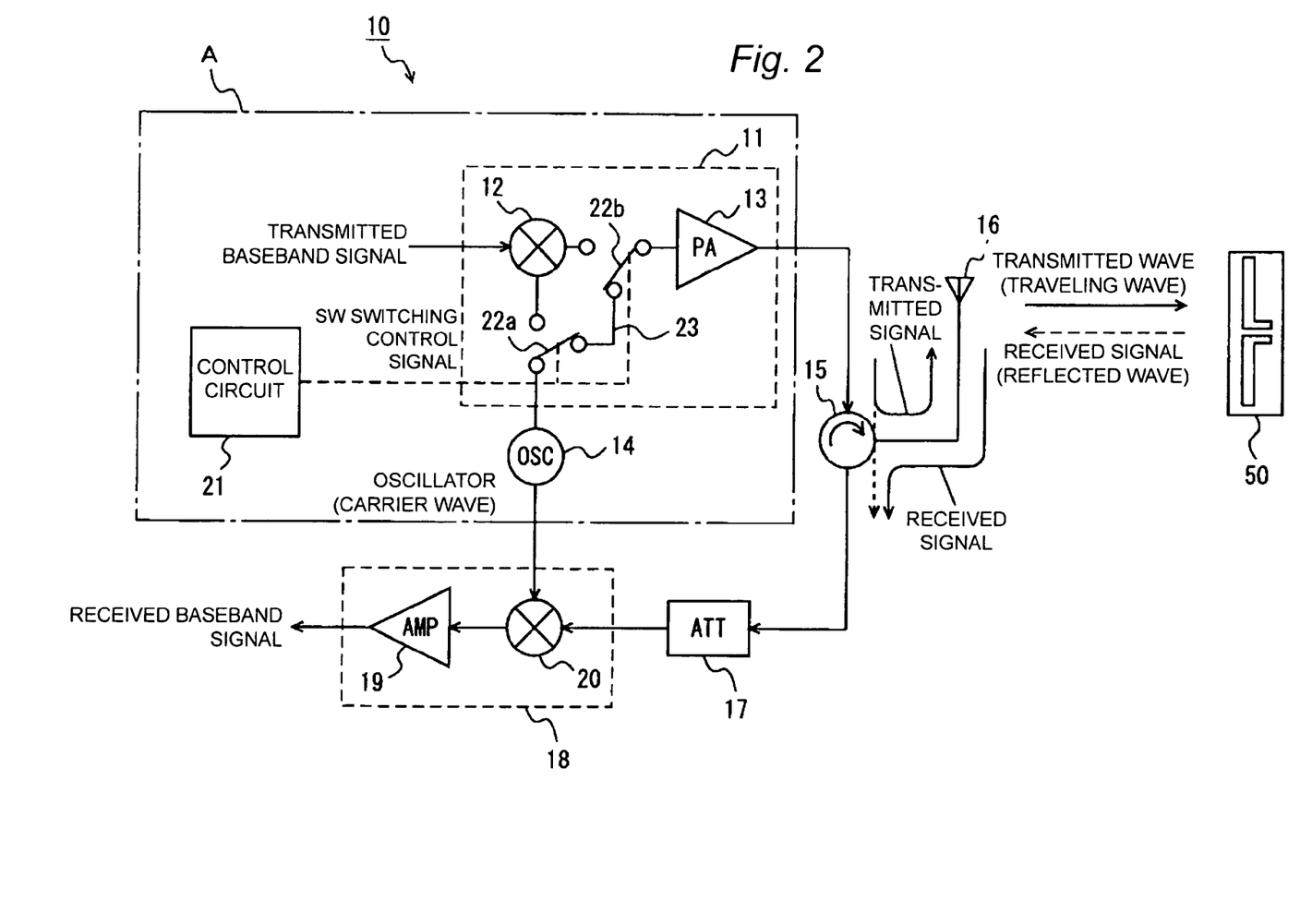
FIG. 2 shows a block diagram showing the relevant part of the reader/writer, illustrating a condition during a non-modulation period.

Hereinafter, an embodiment of the invention is described with reference to drawings. FIGS. 1 and 2 show block diagrams showing a relevant part of a reader/writer in the case of using a transceiver according to the embodiment of the invention for the reader/writer. Referring to FIG. 1, a reader/writer 10 includes an oscillator 14 as an example of an oscillator generating a carrier wave, radio transmission section 11, a radio reception section 18, and a circulator 15 leading a transmitted signal from the radio transmission section 11 to an antenna 16 as a transmission unit, and leading a received signal from an external tag 50 received by the antenna 16 to the radio reception section 18 via an attenuator 17; and performs transmission and reception with respect to the tag 50 via the antenna 16. The radio reception section 18 includes a demodulator 20 and an amplifier 19 as in the related art, wherein a signal amplified by the amplifier 19 is extracted as a received baseband signal.

The radio transmission section 11 includes a modulator 12 receiving a transmitted baseband signal and modulating a carrier wave from the oscillator 14 with the signal; power amplifier 13; bypass circuit 23 for making a bypass between the oscillator 14 and the power amplifier 13; and switches 22a and 22b for selecting whether the carrier wave is allowed to pass through the modulator 12, or through the bypass circuit 23.

A switching control signal for operating the switches 22a and 22b is outputted from a control circuit 21 controlling overall the reader/writer 10.

Next, operation of the reader/writer 10 is described. In the embodiment, connection of the switches 22a and 22b is changed according to the switching control signal from the control circuit 21 between a modulation period and a non-modulation period. That is, the switches 22a and 22b are connected to a modulator 12 side during the modulation period (during command transmission) as shown in FIG. 1. The oscillator 14 and the modulator 12 are thus connected to each other, consequently a carrier wave signal is inputted into the modulator 12 and then modulated.

On the other hand, the switches 22a and 22b are connected to a side of the bypass circuit 23 during the non-modulation period (during response reception) as shown in FIG. 2, consequently the carrier wave signal is directly connected to a circuit in a subsequent stage such as the power amplifier 13 through the bypass circuit 23 without passing through the modulator 12. That is, in the embodiment, the switches 22a and 22b, bypass circuit 23, and control circuit 21 outputting a switch-switching-signal for switching of the switches 22a and 22b configure a control unit or connection unit.

According to such a configuration, since the carrier wave signal is directly transmitted during the non-modulation period, a noise contained in a baseband signal or a noise generated in the modulator is not transmitted as a transmitted signal.

Therefore, the difficulty does not occur in principle, the difficulty being a difficulty that a non-modulated wave (transmitted signal) comes into a side of a reception section, thereby such a noise component is demodulated, and consequently an S/N ratio of the received baseband signal is reduced.

As a result, the S/N ratio during reception is improved, providing an advantage of improvement in communication distance or stabilization of reception performance.

Next, a modification of the embodiment is described. The modification is an approach for a case that difference in transmission level is made between the modulation period and the non-modulation period, wherein a gain adjustment circuit is inserted in the bypass circuit 23 or directly before a carrier wave input terminal of the modulator 12, so that difference in transmission level is not made between the modulation period and the non-modulation period.

Figure 3:
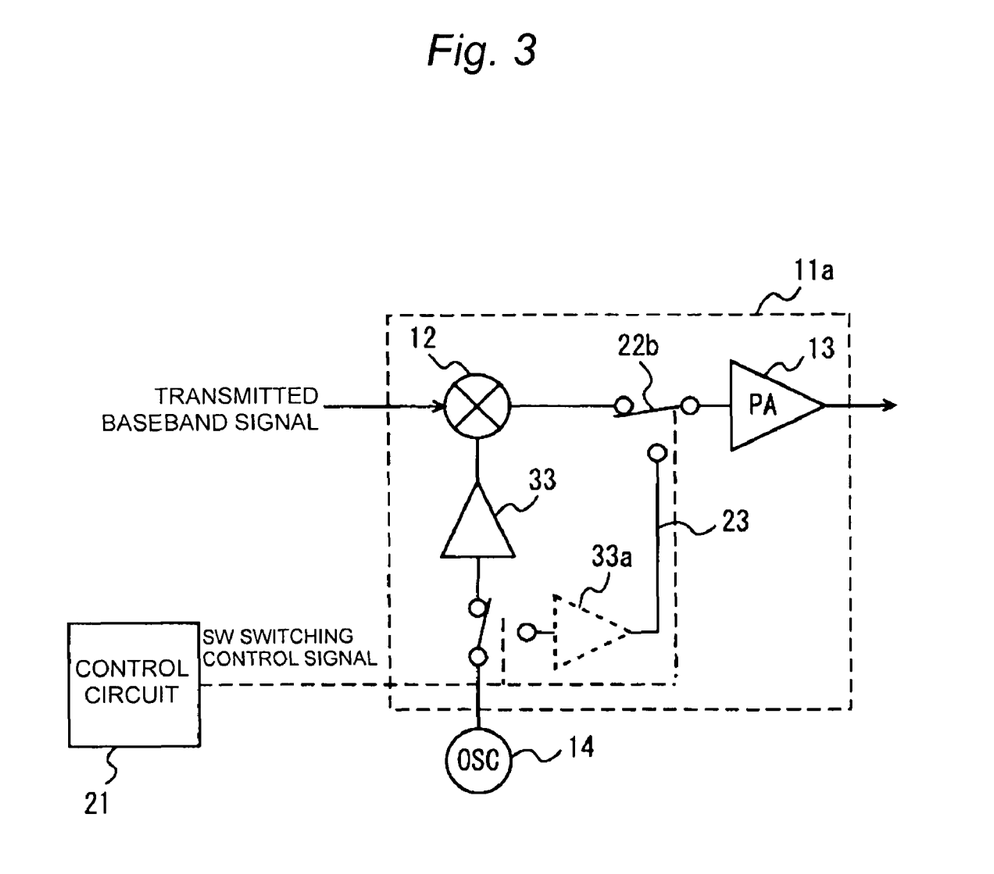
FIG. 3 shows a block diagram showing a relevant part of a reader/writer according to a different embodiment of the invention.

FIG. 3 shows a diagram showing a radio transmission section 11a in the modification, which corresponds to the radio transmission section 11 in FIG. 1. Referring to FIG. 3, the radio transmission section 11a in the modification has a gain adjustment circuit 33 directly before the carrier wave input terminal of the modulator 12 such that difference in transmission level is not made between the modulation period and the non-modulation period. The gain adjustment circuit may be provided in the bypass circuit 23. An example in this case is shown by a dot line 33a in FIG. 3.

Figure 4A:
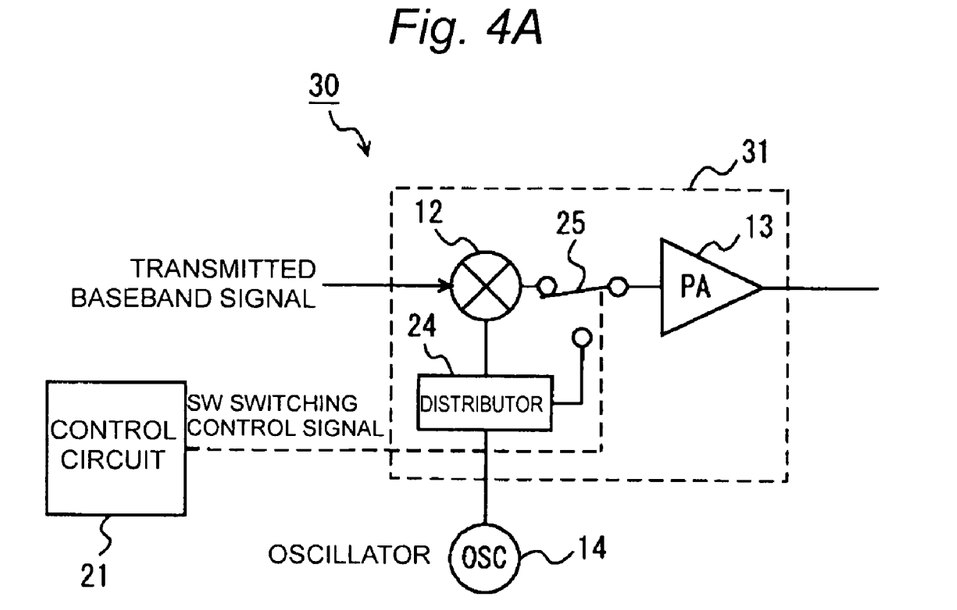
FIG. 4A shows a block diagram showing a relevant part of a reader/writer according to a still different embodiment of the invention.
Figure 4B:
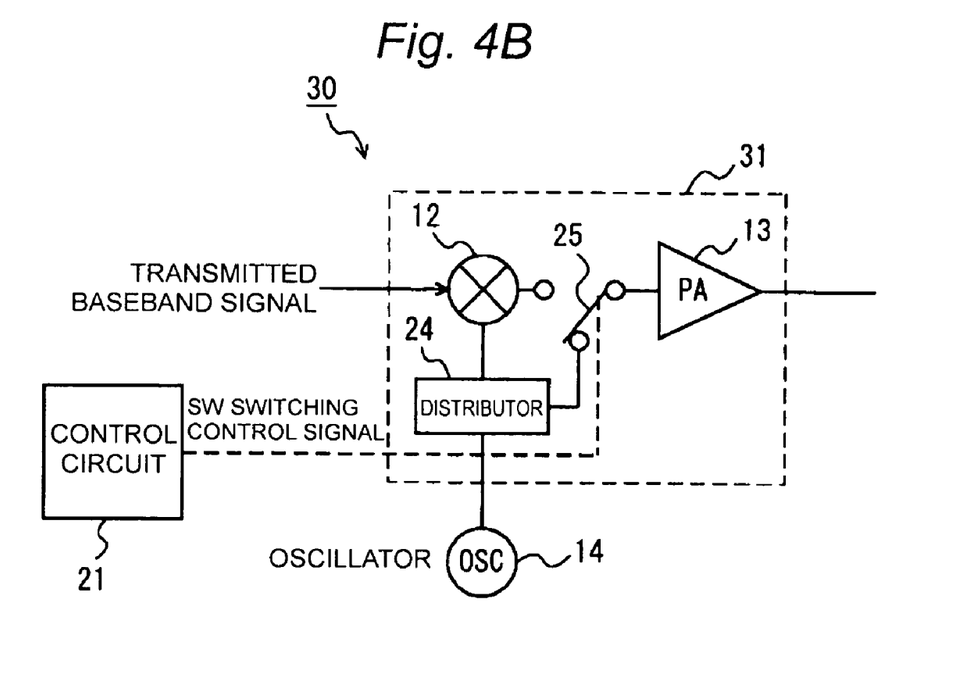
FIG. 4B shows a block diagram showing the relevant part of the reader/writer according to the still different embodiment of the invention.

Next, a different embodiment of the invention is described. FIGS. 4A and 4B show block diagrams showing a configuration of a reader/writer according to a different embodiment of the invention, which correspond to a portion shown by a reference A enclosed by a dashed line in FIGS. 1 and 2. Other portions are omitted to be illustrated and described since they have the same configuration as in FIGS. 1 and 2. FIG. 4A corresponds to FIG. 1 (during the modulation period) in the previous embodiment, and FIG. 4B corresponds to FIG. 2 (during the non-modulation period).

Referring to FIGS. 4A and 4B, a transmission section 31 of a reader/writer 30 in the embodiment has a distributor 24, and a switch 25 for connecting between one of the distributor 24 and the modulator 12 and the power amplifier 13 in place of the switches 22a, 22b and the bypass circuit 23 in the previous embodiment. That is, the carrier wave by the oscillator 14 is outputted via the antenna 16 as the transmission unit with or without passing through the modulator 12 by switching of the switch. Here, the distributor 24, switch 25, and control circuit 21 configure a control unit.

Again in this case, the same advantage as in the previous embodiment is exhibited. In this example, since a distribution ratio to the modulator 12 and the switch 25 can be set in an optional ratio by the distributor 24 in addition to a configuration of the previous embodiment, difference in level between the modulation period and the non-modulation period can be controlled (a ratio at which difference in level is not made can be set) as described in the previous embodiment, and an advantage of cost reduction can be obtained by decreasing the number of switches.

Next, a still different embodiment of the invention is described. The embodiment is adapted for a case that a noise generated in the modulator 12 itself is sufficiently low, and is in a level where the noise of the modulator 12 does not affect the S/N ratio during reception even if the noise comes into a side of the radio reception section 18, and consequently a noise generated in a transmission baseband output section is dominant.

Figure 5A:
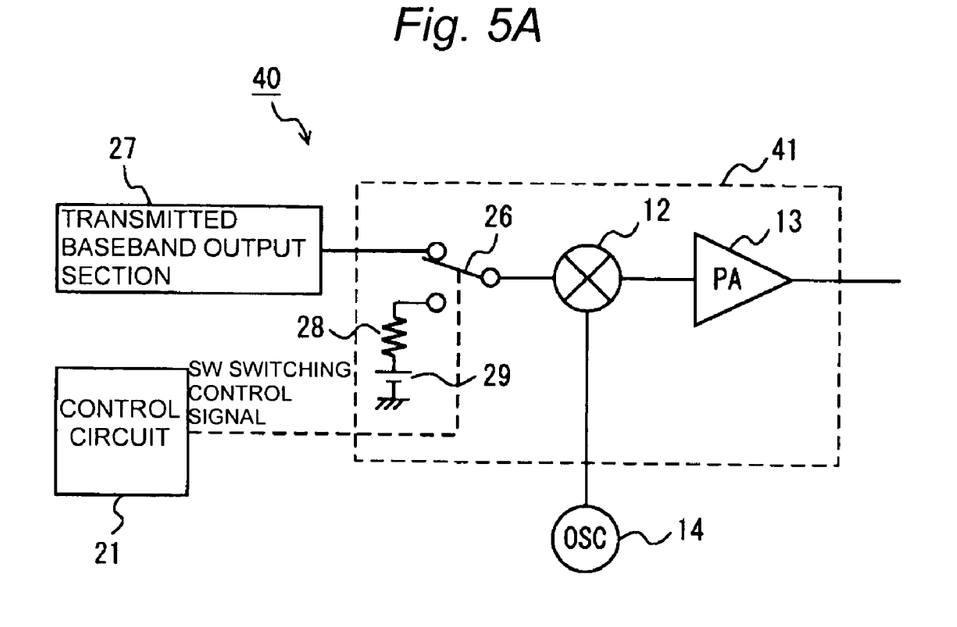
FIG. 5A shows a block diagram showing a relevant part of a reader/writer according to a still different embodiment of the invention.
Figure 5B:
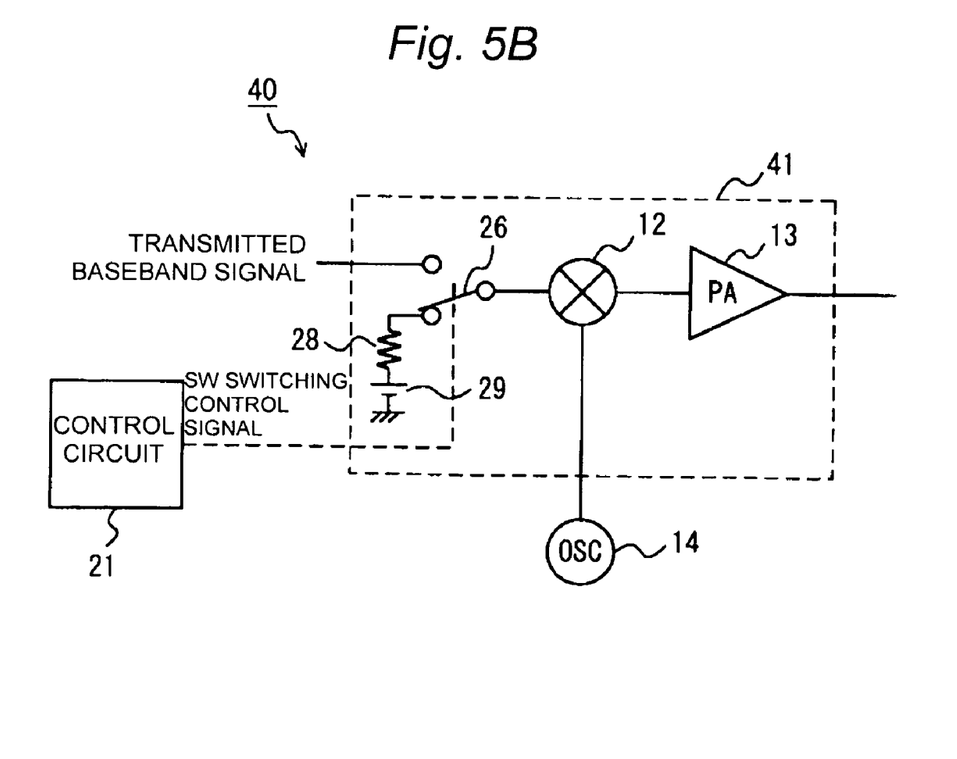
FIG. 5B shows a block diagram showing the relevant part of the reader/writer according to the still different embodiment of the invention.

FIGS. 5A and 5B show block diagrams showing a reader/writer according to the embodiment. Again in this case, the diagrams correspond to the portion shown by the reference A in FIGS. 1 and 2. Other portions are omitted to be illustrated and described since they have the same configuration as in FIGS. 1 and 2. FIG. 5A corresponds to FIG. 1 (during the modulation period) in the previous embodiment, and FIG. 5B corresponds to FIG. 2 (during the non-modulation period).

Referring to FIGS. 5A and 5B, in a transmission section 41 of a reader/writer 40 in the embodiment, the modulator 12 is connected to the oscillator 14. The modulator 12 can be connected to one of a transmission baseband output section 27 outputting a transmission baseband signal via a switch 26 and a terminal resistance 28 grounded via a DC voltage source 29.

That is, in the embodiment, the control circuit 21 controls the switch 26 such that the transmission baseband signal is inputted into the modulator 12 during the modulation period (during command transmission), and the transmission baseband signal is separated from the modulator 12 during the non-modulation period (during response reception). Accordingly, the control circuit 21 and the switch 26 work as an interruption unit interrupting connection between the modulator 12 and the baseband output section (circuit) when the antenna 16 as a transmitter transmits a non-modulated wave.

When the noise generated in the modulator itself is sufficiently low, since a noise generated from a circuit generating a baseband signal is not inputted into the modulator during the non-modulation period by such a configuration, the noise is not transmitted as a transmitted signal.

Accordingly, the difficulty does not occur in principle, the difficulty being a difficulty that a non-modulated wave (transmitted signal) comes into a side of the reception section 18, thereby such a noise component is demodulated, and consequently an S/N ratio of the received baseband signal is reduced. Therefore, the S/N ratio during reception is improved by using the embodiment of the invention, consequently an advantage of improvement in communication distance or stabilization of reception performance in a small number of components is exhibited.

While an electromagnetic wave in any frequency band can be used for the reader/writer in each of the embodiments as described before, since the S/N ratio during reception can be improved, the advantage is particularly significant in a frequency band of 860 to 960 MHz and the UHF band of 2.45 GHz because improvement in communication distance or stabilization in reception performance can be achieved.

While the embodiments were described using the RFID reader/writer as an example as an example of the transceiver, the embodiments are not limited to this, and may be used for a transceiver having transmission and reception functions other than this, for example, a radar.

Furthermore, such functions of the transmitter may be formed as an integrated circuit for transmission and reception, or an integrated circuit for transmission on one chip.

Figure 6A:
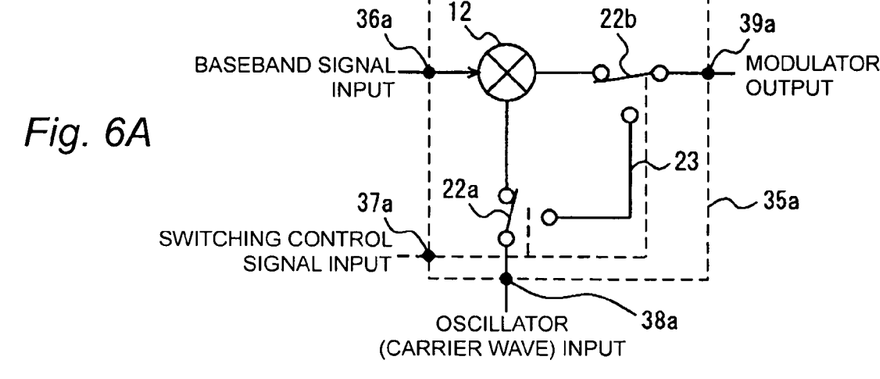
FIG. 6A shows a block diagram showing a relevant part of a reader/writer according to a still different embodiment of the invention.
Figure 6B:
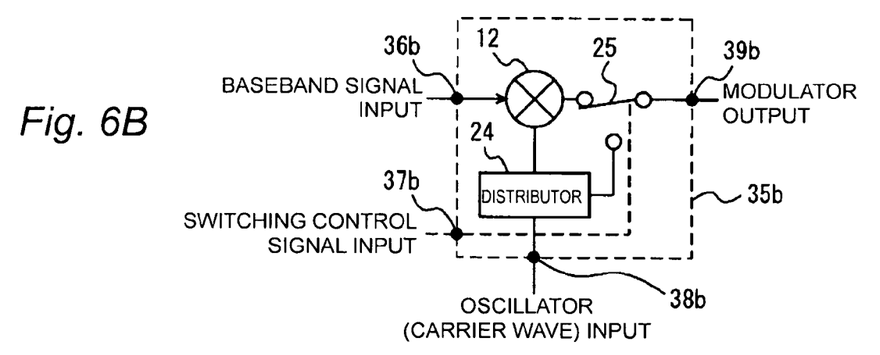
FIG. 6B shows a block diagram showing a relevant part of a reader/writer according to a still different embodiment of the invention.
Figure 6C:
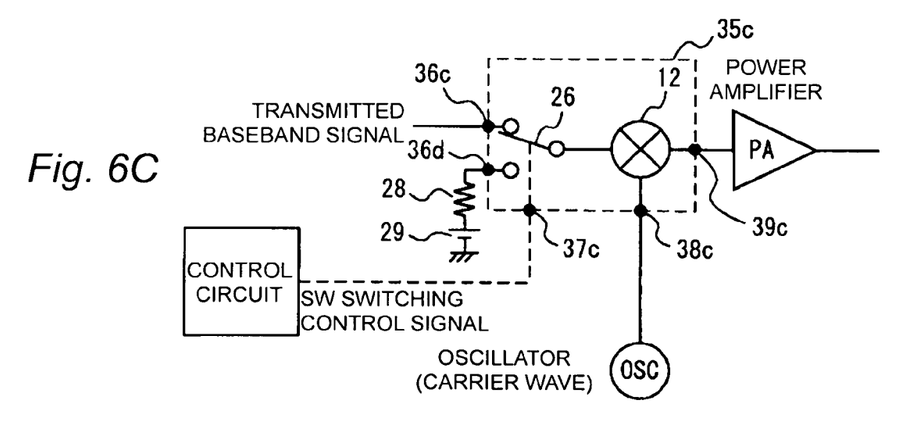
FIG. 6C shows a block diagram showing a relevant part of a reader/writer according to a still different embodiment of the invention.

An example in this case is described with reference to FIGS. 6A to 6C. FIGS. 6A to 6C show block diagrams each of which shows a configuration of a modulation IC (Integrated Circuit) incorporating a modulator and switches for bypassing the modulator. The modulation IC is essentially configured by a portion of the radio transmission section 11 shown in FIG. 1 except for the power amplifier 13.

FIG. 6A shows a block diagram showing a first example of the modulation IC, which corresponds to the portion in FIG. 1. Referring to FIG. 6A, a modulation IC 35a (area enclosed by a dot line in the figure) includes an input terminal 36a for inputting a baseband signal; the modulator 12; the circuit 23 and the switches 22a, 22b for bypassing the modulator 12; an input terminal 37a for inputting a switching signal for switching of the switches 22a, 22b; a carrier wave input terminal 38a for inputting a carrier wave; and an output terminal 39a for outputting a modulated wave or a non-modulated wave. Operation of the modulation IC 35a is the same as that of the corresponding portion in the embodiment as shown in FIG. 1, therefore description of the operation is omitted.

FIG. 6B shows a block diagram showing a second example of the modulation IC. Referring to FIG. 6B, a modulation IC 35b, which corresponds to FIG. 4A, includes an input terminal 36b for inputting a baseband signal; the modulator 12; the distributor 24 and the switch 25 for bypassing the modulator 12; an input terminal 37b for inputting a switching signal for switching of the switch 25; a carrier wave input terminal 38b for inputting a carrier wave; and an output terminal 39b for outputting a modulated wave or a non-modulated wave.

FIG. 6C shows a block diagram showing a third example of the modulation IC. Referring to FIG. 6C, a modulation IC 35c, which corresponds to FIG. 5A, includes input terminals 36c, 36d for inputting a baseband signal or the DC power 29; the modulator 12; the switch 26 for connecting one of the baseband signal and the DC power 29 to the modulator 12; an input terminal 37c for inputting a switching signal for switching of the switch 26; a carrier wave input terminal 38c for inputting a carrier wave; and an output terminal 39c for outputting a modulated wave.

While an example of using an oscillator oscillating at a predetermined frequency was described as an oscillator for generating the carrier wave in the embodiment, the embodiment is not limited to this, and may use any oscillator if it can generate the carrier wave.

Operation of each of the modulation IC 35b and the modulation IC 35c is also the same as that of the corresponding portion in the embodiment as described before, therefore description of the operation is omitted.

While the embodiments of the invention have been described with reference to drawings hereinbefore, the invention is not limited to the shown embodiments. Various modifications or alterations can be applied to the shown embodiments within the same scope as the scope of the invention, or within a scope equal to the scope of the invention.

The transceiver according to the embodiment of the invention enables the S/N ratio during reception, therefore it can be advantageously used as a transceiver.

What is claimed is:

1. A transceiver, which selectively transmits a modulated wave to a tag when transmitting a transmitted signal to the tag and a non-modulated wave to the tag when receiving a response signal from the tag, comprising:
   an oscillator generating a predetermined carrier wave,
   a modulator modulating the carrier wave generated by the oscillator to generate the modulated wave,
   a transmission unit transmitting the modulated wave being modulated by the modulator or the non-modulated wave being not modulated,
   a control unit for causing the transmission unit to transmit the modulated wave to the tag through the modulator when the transmitted signal is transmitted to the tag, and for directly connecting the oscillator to the transmission unit while bypassing the modulator and causing the transmission unit to transmit the non-modulated wave to the tag when the response signal from the tag is received, and
   a bypass circuit for bypassing the modulator by directly connecting the oscillator to the transmission unit, wherein when the transmission unit transmits the non-modulated wave, the control unit transmits the non-modulated wave to the transmission unit via the bypass circuit,
   wherein a switch for routing through one of the bypass circuit or the modulator is provided between the oscillator and the transmission unit, and the control unit performs selection of whether the oscillator is connected to the modulator, or directly connected to the transmission unit, by controlling the switch, so that one of the modulated wave or the non-modulated wave is transmitted from the transmission unit.

2. A modulation integrated circuit, which selectively transmits a modulated wave to a tag when transmitting a transmitted signal to the tag and a non-modulated wave to the tag when receiving a response signal from the tag, comprising:
   a carrier wave input terminal for inputting the carrier wave from the outside,
   a modulator for modulating the carrier wave inputted from the carrier wave input terminal,
   an output terminal for outputting the modulated wave modulated by the modulator, or the non-modulated wave,
   a connection unit connecting the carrier wave inputted from the carrier wave input terminal to the output terminal while passing through the modulator when the modulated wave for transmitting the transmitted signal to the tag is outputted to the tag, and directly connecting the carrier wave to the output terminal without passing through the modulator when the non-modulated wave is outputted to the tag upon receipt of the response signal from the tag, according to a switching signal from the outside, and
   a bypass circuit for bypassing the modulator by directly connecting the oscillator to the transmission unit, wherein when the transmission unit transmits the non-modulated wave, the control unit transmits the non-modulated wave to the transmission unit via the bypass circuit,
   wherein a switch for routing through one of the bypass circuit or the modulator is provided between the oscillator and the transmission unit, and the control unit performs selection of whether the oscillator is connected to the modulator, or directly connected to the transmission unit, by controlling the switch, so that one of the modulated wave or the non-modulated wave is transmitted from the transmission unit.

3. An RFID reader/writer, comprising: the integrated circuit according to claim 2.

* * * * *